United States Patent
Holifield

(10) Patent No.: US 6,207,050 B1
(45) Date of Patent: Mar. 27, 2001

(54) MAGNETIC CORE FOR AN OIL FILTER

(76) Inventor: Bill A. Holifield, P.O. Box 746, Yelm, WA (US) 98597

( * ) Notice: Subject to any disclaimer, the term of this patent is extended or adjusted under 35 U.S.C. 154(b) by 0 days.

(21) Appl. No.: 09/429,133

(22) Filed: Oct. 26, 1999

Related U.S. Application Data

(60) Provisional application No. 60/105,707, filed on Oct. 26, 1998.

(51) Int. Cl.$^7$ .................................................. B01D 35/06
(52) U.S. Cl. ......................... 210/223; 210/222; 210/335; 210/338; 210/440; 210/DIG. 17; 184/6.25
(58) Field of Search ......................... 184/6.25; 210/222, 210/223, 323.1, 335, 338, 440, DIG. 47

(56) References Cited

U.S. PATENT DOCUMENTS

| | | |
|---|---|---|
| D. 307,461 | 4/1990 | Kim . |
| 3,035,703 | 5/1962 | Pall . |
| 4,629,558 | 12/1986 | Garritty . |
| 4,705,626 | 11/1987 | Morelli . |
| 5,078,871 * | 1/1992 | McCready ............................ 210/223 |
| 5,228,990 | 7/1993 | Chiang . |
| 5,462,662 | 10/1995 | Chen . |

* cited by examiner

Primary Examiner—David A. Reifsnyder
(74) Attorney, Agent, or Firm—Christensen O'Connor Johnson Kindness PLLC

(57) ABSTRACT

A filter (10) for a vehicle is provided. The filter includes a casing (12) having an inlet (22), a plurality of outlets (25) and a passage extending within the casing. The inlet and outlet are adapted to be in fluid communication with a fluid system of a vehicle. The filter further includes a first filter (26) disposed within the passage and a core (20) received with the passage. The core is adapted to be in fluid communication with the fluid system, wherein at least a portion of the core is magnetized such that fluid passing through the fluid system passes through the core and ferrous particles within the fluid are magnetically captured by the core.

14 Claims, 3 Drawing Sheets

MAGNETIC CORE FOR AN OIL FILTER

RELATED APPLICATIONS

This application claims the benefit of U.S. Provisional Application Ser. No. 60/105,707, filed on Oct. 26, 1998.

FIELD OF THE INVENTION

The present invention relates generally to oil filters for internal combustion engines and, in particular, to an oil filter having a magnetic core to remove ferrous metal particles.

BACKGROUND OF THE INVENTION

Oil is necessary for lubrication and cooling of an internal combustion engine. Because lubricating oil flows to all parts of the engine, it is desirable that it does not carry abrasive or corrosive material. Such material may come from the combustion process, dirt in inducted air, or from parts of the engine itself. Therefore, it is common practice to filter oil or parts of the oil as it flows through the system to reduce wear of an oil filter.

Ideally, oil filters remove all abrasive materials and particles in the oil, even microscopic metal particles which are abraded from the moving surfaces of the engine during normal engine operation. However, for a filter to remove all of this material, the filter would have to be designed and constructed of a material suitable to remove these microscopic particles. As a result, such a filter would either severely impede the flow of oil to a degree where insufficient oil would flow or excessively high oil pressures would be required to force oil through this filter.

Currently, one proposed solution to filter out ferrous particles includes modifying oil filters after manufacture with a reusable magnetic core insert, as described in U.S. Pat. No. 5,228,990, issued to Chiang. Such inserts are intended to be inserted into the core of an oil filter before the oil filter is attached to an engine. In particular, the metallic insert is a cylindrical-shaped structure that includes a plurality of alternating layers of washers, cylindrical sieves and magnets. The layers are stacked one upon each other to form the cylindrical core. The core is sealed at both ends by caps. The core also includes a centrally located cylindrical sieve extending between the end caps. During operation of the motor, oil is circulated through the oil filter, such that any ferrous particles are drawn from the oil by the magnets of the core insert. Although such core inserts are effective at filtering out ferrous materials, they are not without their problems.

First, because such core inserts are manufactured from repeating layers of metal and magnets, they are expensive. Also, because only a small portion of the length of the insert is magnetized, the effectiveness of the inserts to filter out ferrous particles is limited.

Thus, there exists a need for an improved oil filter having a metallic filter that not only captures a large percentage of ferrous particles, but also is economical to manufacture and meets the performance expectations of the operator of the vehicle.

SUMMARY OF THE INVENTION

In accordance with the present invention, a filter for a vehicle is provided. The filter includes a casing having an inlet, an outlet and a passage extending between the inlet and outlet. The inlet and outlet are adapted to be in fluid communication with a fluid system of the vehicle. The filter further includes first and second filters disposed within the passage. The second filter is adapted to be in fluid communication with the fluid system, wherein at least a portion of the second filter is magnetized such that fluid passing through the fluid system passes through the second filter and ferrous particles within the fluid are magnetically captured by the second filter.

In accordance with other aspects of this invention, the first and second filters are cylindrical and the second filter is sized to be received within the first filter.

In accordance with additional aspects of this invention, the filter further includes a first layer of magnetic material bonded to an outwardly facing side of the second filter.

In accordance with yet other aspects of this invention, the filter further includes a first layer of magnetic material bonded to an inwardly facing side of the second filter. In yet another aspect of the present invention, a second layer of magnetic material is bonded to an outwardly facing side of the second filter, such that first and second layers of magnetic material are bonded to the inwardly and outwardly facings of the second filter.

In accordance with still yet other aspects of this invention, the second filter is a substantially unitary component of magnetic material.

A filter for a vehicle formed in accordance with the present invention has several advantages over currently available magnetic filters. First, because the filter includes a second filter that is a substantially unitary component of magnetic material, it is more economical than repeating layers of magnets. Also, because the second filter is a substantially unitary component, it has greater reliability due to a greater surface area of magnetic attraction to draw out ferrous particles within the fluid. Finally, such a filter is easier to use because the magnetic second filter is designed to be disposable with the oil filter after use. Thus, a filter formed in accordance with the present invention is economical, reliable, and easier to use than currently available filters.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
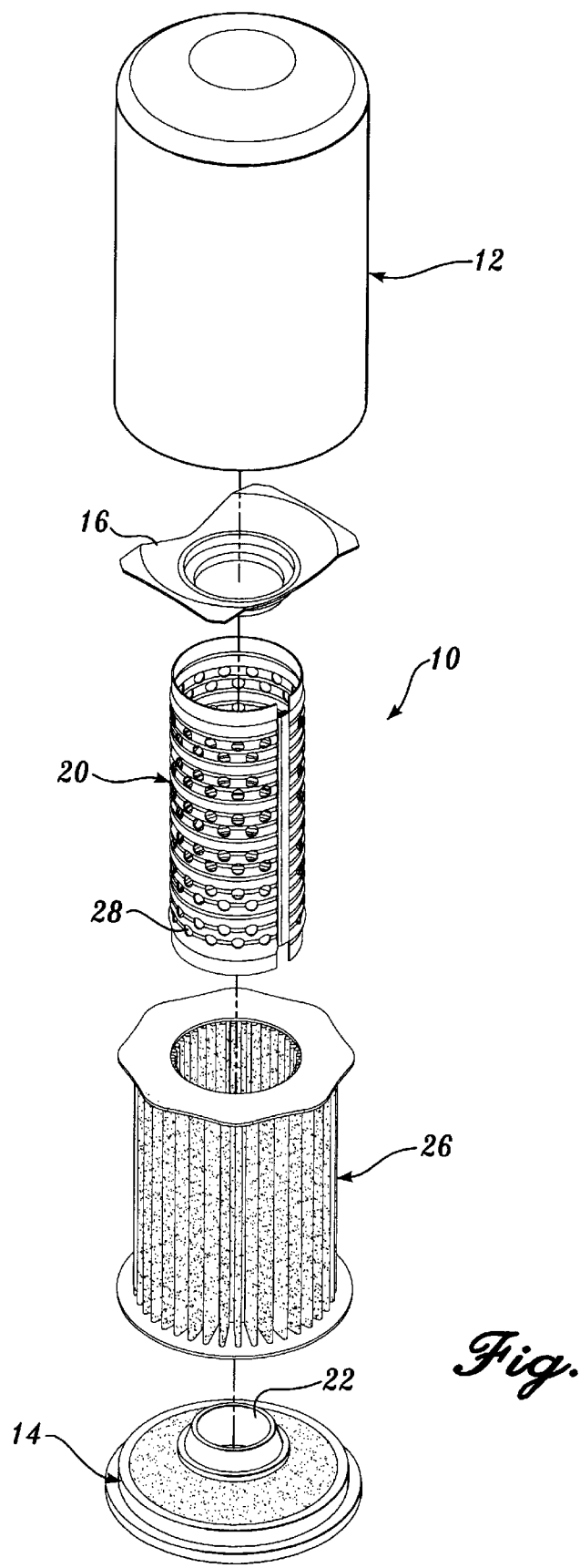
FIG. 1 is an exploded view of a filter formed in accordance with the present invention showing the major components of the filter.
Figure 2:
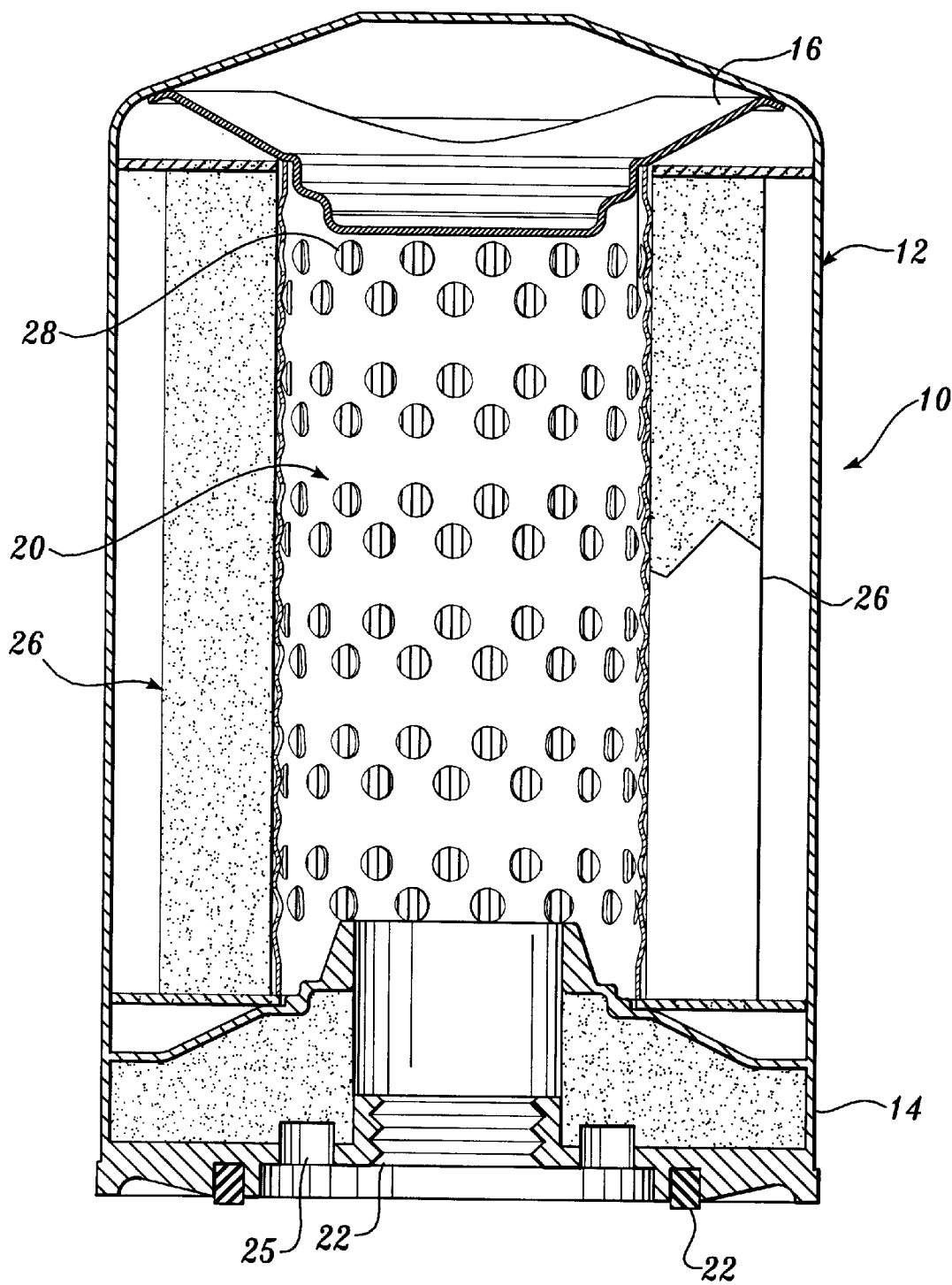
FIG. 2 is a cross-sectional side view of a filter formed in accordance with the present invention showing a magnetic filter received within a first non-magnetic filter.

FIGS. 1 and 2 illustrates a preferred embodiment of an oil filter 10 having a magnetic core 20 constructed in accordance with the present invention. The magnetic core 20 is illustrated as inserted within a well-known oil filter 10 for a vehicle (not shown). Although the magnetic core 20 is illustrated as being inserted within a well-known oil filter 10 for a vehicle, it should be apparent that such cores may be used for other types of applications, such as generators, industrial equipment and marine engines, and therefore, such applications are also within the scope of the present invention.

The oil filter 10 has the same general shape as a conventional canister style oil filter. Such filters 10 generally include a canister 12, an end cap 14 having an internally threaded opening 22 for engine application, an annular rubber gasket 24 and a fibrous filtering media 26. Such filtering media 26 are made from a well-known material such as paper, and are designed for catching small particles of dirt and debris. The magnetic core 20 and filtering media 26 are seated against the end cap 14 and are secured therein by an well-known end seal 16.

The cylindrical center core 20 is a unitary body that is suitably magnetized to attract small metal chips and shavings that eventually work loose from internal components of the engine. As a non-limiting example, the core 20 may be suitably injection molded from a thermoplastic material having magnetic properties, such as HM90-TPL28 sold by Bangor Electronics Company. Also, the core 20 may be formed from two or more pieces for ease of manufacture.

Preferably, the core 20 measures approximately 4 inches long, 1.6 inches in inner diameter and 1.7 inches in outer diameter. Preferably, the core 20 contains a series of holes 28 that each measure approximately 0.14 inch in diameter. These holes 28 create equidistant rows along the length of the core 20 to facilitate oil flow. As sized, such a core 20 is insertable into a standard size oil filter during assembly of that filter. However, it should be apparent to one of ordinary skill that a core 20 constructed in accordance with the present invention may be sized to fit within a larger or smaller oil filter. Further, the core 20 may include a greater or less number of holes 28.

It is intended that the magnetic core be inserted within the oil filter during assembly of the oil filter. However, alternate embodiments, such as a reusable core that may be inserted into the oil filter after assembly of the oil filter, are also within the scope of the present invention.

In operation, ferrous shavings that develop within the engine would be captured by the magnetic core 20 within the filter as the lubricant is circulated through the oil filter 10. The particles remain within the filter body while clean oil is returned to the galleries of the engine. While designed primarily for road motor vehicle applications, other applications, such as generators, industrial equipment and marine engines, are also within the scope of the present invention. Further, such magnetic core inserts may be used in other applications, such as filtering hydraulic systems or transmissions.

Figure 3:
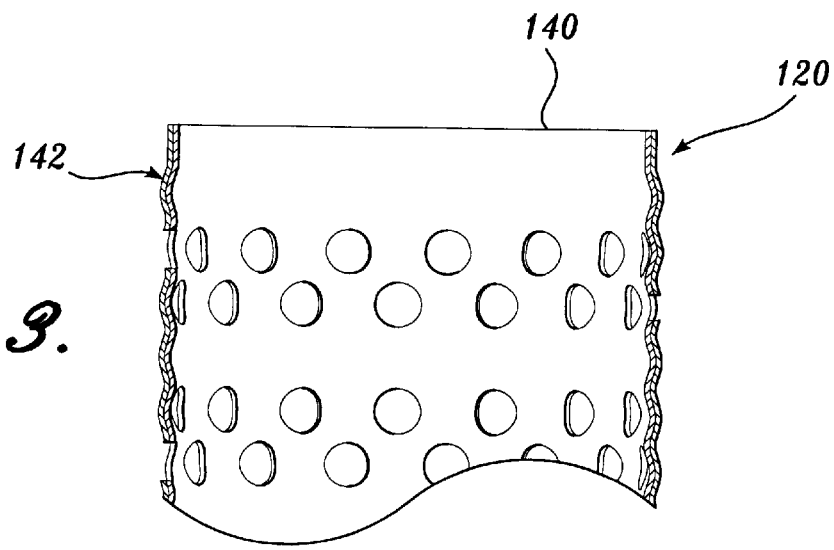
FIG. 3 is a cross-sectional side view of a filter formed in accordance with the present invention showing a first alternate embodiment of a magnetic core for the filter.

Referring now to FIG. 3 a first alternate embodiment of a magnetic core 120 formed in accordance with the present invention will now be described in greater detail. The core 120 of the first alternate embodiment is identical to the preferred embodiment described above with the following exception. The magnetic core 120 includes a cylindrical body 140 and a layer of magnetic material 142. The body 140 is suitably formed from a high strength material, such steel. The well known magnetic material 142 is suitably bonded to the outwardly facing surface of the body 140. As noted above, the magnetic core 120 of the first alternate embodiment, operates in the manner described above for the preferred embodiment, wherein as fluid passes through the filter, any ferrous material within the fluid is magnetically captured by the magnetic material 142.

Figure 4:
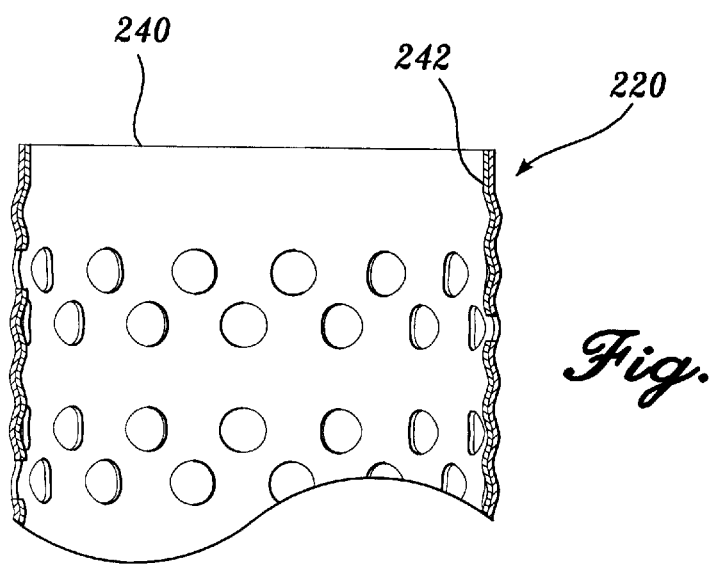
FIG. 4 is a cross-sectional side view of a filter formed in accordance with the present invention showing a second alternate embodiment of a magnetic core for the filter.

Referring now to FIG. 4, a second alternate embodiment of a magnetic core 220 formed in accordance with the present invention will now be described in greater detail. The magnetic core 220 is identical in material and operation to the first alternate embodiment described above with the following exception. In the second alternate embodiment, the magnetic material 242 is bonded to the inwardly facing surface of the cylindrical body 140. As a result, as fluid passes through the magnetic core 220, any ferrous particles in the fluid are magnetically captured by the magnetic material 242.

Figure 5:
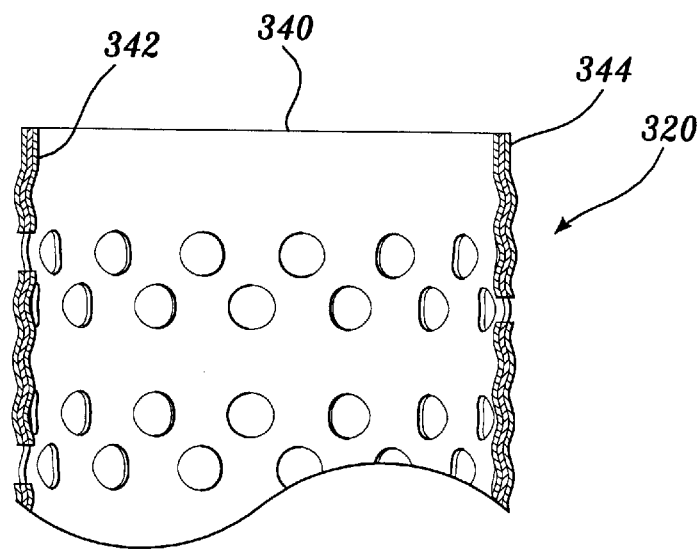
FIG. 5 is a cross-sectional side view of a filter formed in accordance with the present invention showing a third alternate embodiment of a magnetic core for the filter.

Referring now to FIG. 5, a third alternate embodiment of a magnetic core 320 formed in accordance with the present invention will now be described in greater detail. The magnetic core 320 is identical in materials and operation as the first and second alternate embodiments described above, with the following exception. In the third alternate embodiment, the magnetic core 320 includes first and second layers of magnetic material 342 and 344 bonded to each of the inwardly and outwardly facing surfaces of the body 340. As configured, the body 340 is plated with magnetic material on both the inward and outwardly facing sides of the body 340, such that as fluid passes either side of the body 340, the magnetic material 342 and 344 magnetically captures any ferrous particles in the fluid.

The previously described versions of the present invention provides several advantages over oil filters currently available in the art. First, because the filter includes a second filter that is a substantially unitary component of magnetic material, it is more economical than repeating layers of magnets. Also, because the second filter is a substantially unitary component, it has greater reliability due to a greater surface area of magnetic attraction to draw out ferrous particles within the fluid. Finally, such a filter is easier to use because the magnetic core is designed to be disposable with the oil filter after use. Thus, a filter formed in accordance with the present invention is economical, reliable, and easier to use than currently available filters.

From the foregoing descriptions, it may be seen that the magnetic core formed in accordance with the present invention incorporates many novel features and offers significant advantages over currently available oil filters. While the presently preferred embodiments of the invention have been illustrated and described, it is to be understood that within the scope of the appended claims, various changes can be made therein without departing from the spirit and scope of the invention. As a non-limiting example, the magnetic core may be formed from one or more pieces for ease of manufacturing. Thus, it should be apparent that changes can be made therein without departing from the spirit and scope of the invention.

The embodiments of the invention in which an exclusive property or privilege is claimed are defined as follows:

1. A filter for a vehicle, comprising:
   (a) a casing having an inlet, an outlet, a length and a passage extending within the casing, the inlet and outlet are adapted to be in fluid communication with a fluid system of the vehicle;
   (b) a first filter disposed within the passage; and
   (c) a unitary core received within the passage and extending substantially the length of the casing, the core having a length and adapted to be in fluid communication with the fluid system, wherein at least a portion of the core is magnetized for the length of the core, such that fluid passing through the fluid system passes through the core and ferrous particles within the fluid are magnetically captured by the core.

2. The filter of claim 1, wherein the first filter and the core are cylindrical and the core is sized to be received within the first filter.

3. The filter of claim 2, further comprising a first layer of magnetic material bonded to an outwardly facing side of the core.

4. The filter of claim 2, further comprising a first layer of magnetic material bonded to an inwardly facing side of the core.

5. The filter of claim 4, further comprising a second layer of magnetic material bonded to an outwardly facing side of the core.

6. The filter of claim 2, wherein the core is a unitary component of magnetic material.

7. A filter for an engine of a vehicle, the filter comprising:
(a) a casing having an inlet, an outlet, a length and a passage extending within the casing, the inlet and outlet adapted to be in fluid communication with a fluid system of the engine;
(b) a cylindrical filter disposed within the passage; and
(c) a magnetic core received within the cylindrical filter and adapted to be in fluid communication with the fluid system, wherein the magnetic core having at least of portion thereof magnetized such that fluid passing through the fluid system passes through the magnetic core and ferrous particles within the fluid are magnetically captured by the magnetic core, wherein the magnetic core is unitary and extends substantially the length of the casing.

8. The filter of claim 7, wherein the magnetic core is injection molded from a magnetic material.

9. A filter for an engine of a vehicle, the filter comprising:
(a) a casing having an inlet, an outlet, a length and a passage extending within the casing, the inlet and outlet adapted to be in fluid communication with a fluid system of the engine;
(b) a first filter disposed within the passage; and
(c) a unitary core received within the first filter, the core having a length and adapted to be in fluid communication with the fluid system, the core extending substantially the length of the casing and being magnetized for the length of the core such that fluid passing through the fluid system passes through the core and ferrous particles within the fluid are magnetically captured by the core.

10. The filter of claim 9, further comprising a first layer of magnetic material bonded to an inwardly facing side of the core.

11. The filter of claim 10, further comprising a second layer of magnetic material bonded to an outwardly facing side of the core.

12. The filter of claim 9, further comprising a first layer of magnetic material bonded to an outwardly facing side of the core.

13. A filter assembly for a vehicle comprising:
(a) a casing having an inlet, an outlet, and a passage having a length and extending within the casing, the inlet and the outlet adapted to be in fluid communication with a fluid system of the vehicle; and
(b) a unitary core received within the passage, the core being formed from a magnetic material to magnetically attract particles within the fluid system, wherein the core extends substantially the length of the casing.

14. The filter assembly of claim 13, wherein the core is injection molded from a thermoplastic material having magnetic properties.

* * * * *